United States Patent
Ahuja et al.

(10) Patent No.: US 9,026,782 B2
(45) Date of Patent: May 5, 2015

(54) TOKEN-BASED ENTITLEMENT VERIFICATION FOR STREAMING MEDIA DECRYPTION

(75) Inventors: Sanjay Thakurdas Ahuja, Irving, TX (US); Enrique Ruiz-Velasco, Flower Mound, TX (US); Laxmi Ashish Arte, Austin, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 277 days.

(21) Appl. No.: 13/454,125

(22) Filed: Apr. 24, 2012

(65) Prior Publication Data

US 2013/0283033 A1 Oct. 24, 2013

(51) Int. Cl.
*H04L 9/00* (2006.01)
*H04L 9/32* (2006.01)

(52) U.S. Cl.
CPC .................................. *H04L 9/3213* (2013.01)

(58) Field of Classification Search
CPC .... H04L 9/3213; H04L 63/00; H04L 2209/60
USPC .......................................................... 713/150
See application file for complete search history.

(56) References Cited

U.S. PATENT DOCUMENTS

| | | | |
|---|---|---|---|
| 2002/0162121 A1* | 10/2002 | Mitchell | 725/135 |
| 2006/0059563 A1* | 3/2006 | Baker | 726/26 |
| 2010/0011103 A1* | 1/2010 | Luzzatti et al. | 709/226 |
| 2010/0077216 A1* | 3/2010 | Kramer et al. | 713/172 |
| 2012/0047542 A1* | 2/2012 | Lewis et al. | 725/97 |
| 2012/0096526 A1* | 4/2012 | Brahmanapalli et al. | 726/6 |
| 2012/0117225 A1* | 5/2012 | Kordasiewicz et al. | 709/224 |

* cited by examiner

*Primary Examiner* — Peter Shaw

(57) ABSTRACT

A device sends an authentication request from the device to a session management server, and receives a token from the session management server if the device authenticates successfully. The device obtains a streaming media playlist file from a content delivery server, and sends the token to a key server for token validation. The device receives a decryption key from the key server if the token validates successfully, and requests a first streaming media segment file from the content delivery server based on the playlist file. The device receives the first streaming media segment file from the content delivery server; and decrypts the first streaming media segment file using the decryption key.

25 Claims, 12 Drawing Sheets

US 9,026,782 B2

TOKEN-BASED ENTITLEMENT VERIFICATION FOR STREAMING MEDIA DECRYPTION

BACKGROUND

Hypertext Transfer Protocol (HTTP) Live Streaming (HLS) is a HTTP-based media streaming communications protocol that involves breaking the media stream into a sequence of file downloads. Each file may be downloaded as one portion of a transport stream. Each downloaded file may be played in sequence to present a continuous media stream. As a given stream is played, the client may choose from multiple different alternative streams containing the same content encoded at various data rates. At the beginning of a streaming session, the client downloads a playlist file that specifies the different or alternate streams that are available.

In HLS, a given multimedia presentation is specified by a Uniform Resource Identifier (URI) to the playlist file, which itself consists of an ordered list of media URIs and informational tags. Each media URI refers to a media file that is a segment of a single continuous media stream. To play a stream, a client first obtains the playlist file and then obtains and plays each media file in the playlist in sequence.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein implement processes for performing token-based entitlement verification for decrypting media streamed to a device from a content delivery server. In the exemplary embodiments described herein, a device first authenticates with a session management server. If the device authenticates successfully, the session management server then returns an encrypted token to the device. The encrypted token may include data that may subsequently be used in validating the token by a key server. The device may send the encrypted token to the key server and, if the token validates successfully, the key server may return a decryption key to the device that the device may use to decrypt media streamed from a content delivery server to the device.

Figure 1:
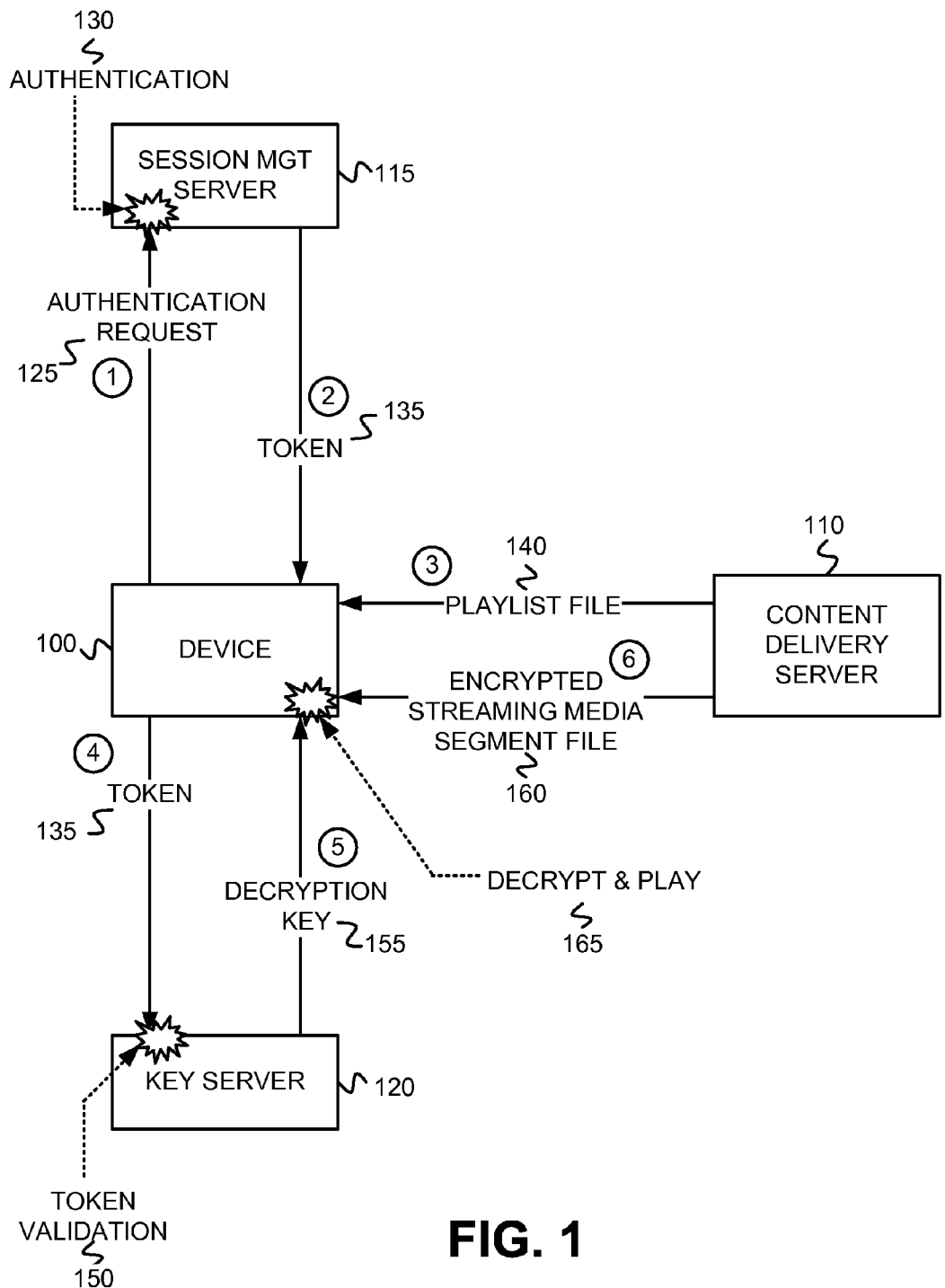
FIG. 1 is a diagram that depicts an exemplary overview of token-based entitlement verification for decrypting media streamed from a content delivery server to a device.

FIG. 1 illustrates an exemplary overview of token-based entitlement verification for decrypting media streamed from a content delivery server to a device. As shown in FIG. 1, token-based streaming media decryption, as described further herein, may involve a session management server 115 for authentication of a device 100 and token delivery to device 100, a key server 120 for token validation and decryption key delivery to device 100 based on the results of the token validation, and a content delivery (CD) server 110 for delivery of a streaming media playlist file and one or more encrypted streaming media segment files to device 100. Device 100 may include a cellular telephone (e.g., smart phone); a laptop, desktop, palmtop or tablet computer; a set-top box (STB); a personal digital assistant (PDA); or any other type of digital computing device that has a capability to communicate via a network to receive streaming media. As one of the functions that device 100 may perform, device 100 may obtain encrypted streaming media from an external server (e.g., content delivery server 110), and may play the decrypted streaming media at device 100 using a media player (not shown).

As shown in FIG. 1 (identified with a "1" within a circle), device 100 may initially send an authentication request 125 to session management server 115 to perform an authentication process 130. The authentication request 125 may, for example, identify a channel over which device 100 seeks to receive streaming media and further include a unique network address associated with device 100. In one implementation, the unique network address may include an Internet Protocol (IP) address of device 100. The authentication 130 of device 100 may include verifying the unique network address of device 100. In other implementations, authentication may include verifying a signature of device 100 included in authentication request 125. The signature may include, for example, a hash of the device's unique network address. Upon successful authentication, session management server 115 may obtain a token for authentication request 125, may encrypt the token using an encryption algorithm, and may return the token 135 (identified with a "2" within a circle in FIG. 1) to device 100. The encryption algorithm may include any type of encryption algorithm where the encryption/decryption key(s) is not known to device 100, but is known to key server 120.

As further shown in FIG. 1, upon receipt of token 135, device 100 may request (not shown in FIG. 1) and receive (identified with a "3" within a circle) a playlist file 140 from CD server 110. Playlist file 140 may include, for example, an ordered list of media Uniform Resource Identifiers (URIs) and informational tags, with each media URI referring to a media file which is a segment of a single continuous stream of media, or referring to another playlist file. Playlist file 140 may be organized as set forth in the Internet Draft of "HTTP Live Streaming" dated Nov. 19, 2010.

Device 100, subsequent to receiving playlist file 140 from CD server 110, may send (identified with a "4" within a circle) the token 135 (previously received from session management server 115) to key server 120 for token validation 150. Token validation 150 may include verifying that the token has not expired, and verifying that a device network address contained in the token matches a device network address contained in a header of the message from device 100 that includes the token. Upon the successful validation of token 135, key server 120 may return (identified with a "5" within a circle) a decryption key 155 to device 100. Decryption key 155 may subsequently used to decrypt, at device 100, an encrypted streaming media segment file from CD server 110.

After receiving playlist file 140, device 100 may read the ordered list of media URIs and informational tags of playlist file 140 and may request (not shown in FIG. 1) one or more streaming media segment files identified in playlist file 140. CD server 110, upon receipt of the request, may encrypt the requested streaming media segment file(s) using an encryption algorithm and may return the encrypted streaming media segment file (identified with a "6" in FIG. 1) to device 100. CD server 110 may use a different encryption algorithm for encrypting the streaming media segment file(s) than the algorithm used by session management server 115. Alternatively, CD server 110 may use a same encryption algorithm for encrypting the streaming media segment file(s) as the algorithm used by session management server 115, but may use a different encryption key(s). In one exemplary implementation, CD server 110 may use AES encryption to encrypt the streaming media segment file. For example, CD server 110 may use a 128 bit key AES encryption algorithm. Key server 120 may obtain and store the decryption key that may decrypt the encryption of the streaming media segment file(s) performed by CD server 110.

Using the decryption key 155 received from key server 120, and a counterpart decryption algorithm to the encryption algorithm used by CD server 110 to encrypt the streaming media segment file 160, device 100 may decrypt 165 the encrypted streaming media segment file 160 received from CD server 110 and may play the file at device 100 using, for example, a media player (not shown).

Figure 2A:
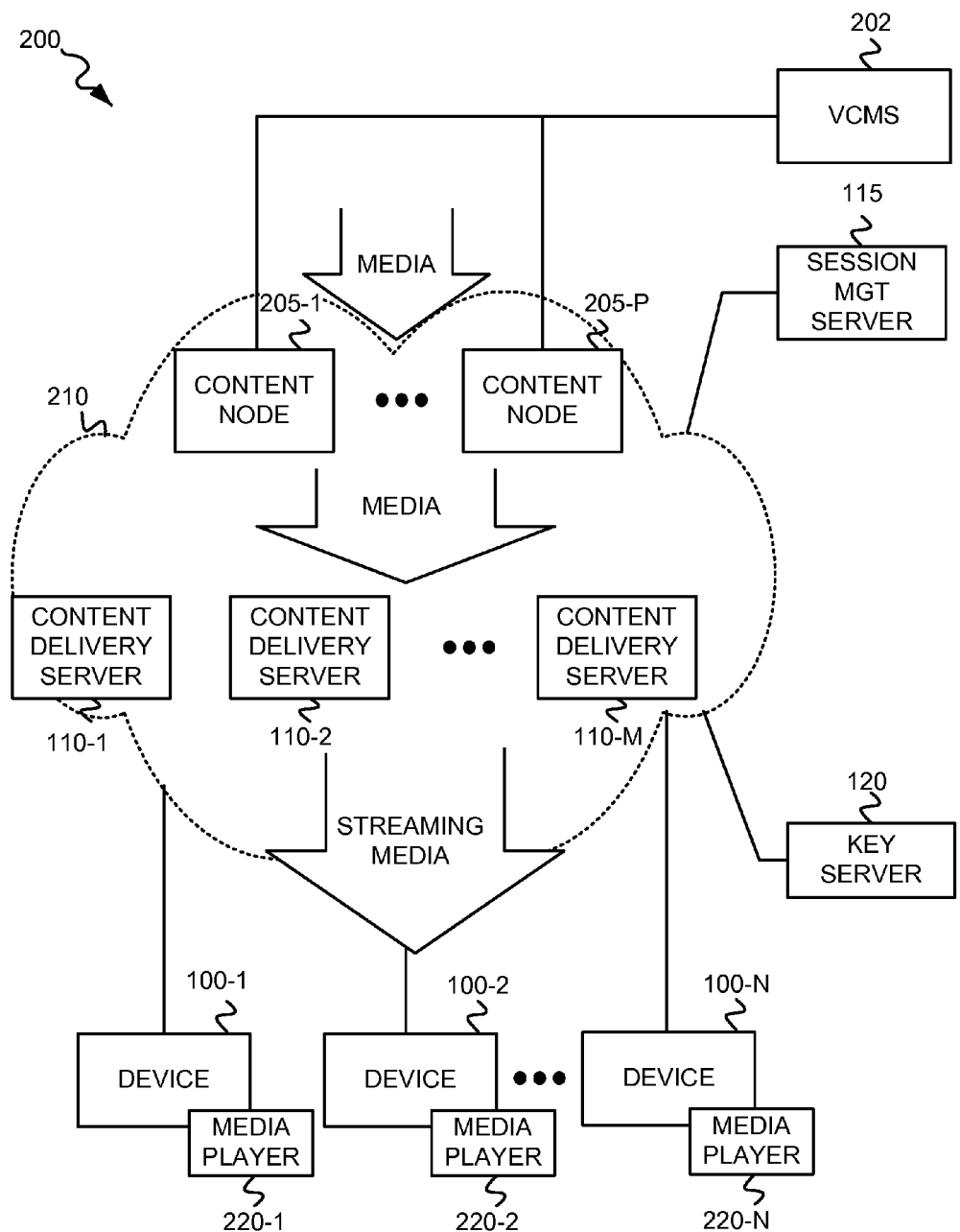
FIG. 2A is a diagram that depicts an exemplary network environment in which streaming media is delivered to one or more devices.

FIG. 2A depicts an exemplary network environment 200 in which streaming media is delivered to one or more devices. Network environment 200 may include a Virtual Central Management System (VCMS) 202, a media delivery network 210, session management server 115, key server 120, and devices 100-1 through 100-N (generically and individually referred to herein as "device 100").

VCMS 202 may include a system that manages the delivery of streaming media via nodes of media delivery network 210 to devices 100-1 through 100-N. Media delivery network 210 may include multiple nodes for delivering media and/or other data to devices 100-1 through 100-N. As shown in FIG. 2A, media delivery network 210 may include content nodes 205-1 through 205-P (generically and individually referred to herein as "content node 205") and content delivery servers 110-1 through 110-M (generically and individually referred to herein as "content delivery server 110" or "CD server 110"). Content nodes 205-1 through 205-P may include network nodes that distribute streaming media to selected ones of content delivery servers 110-1 through 110-M based on management instructions from VCMS 202. Content delivery servers 110-1 through 110-M may include network nodes that receive media delivered from content nodes 205-1 through 205-P and/or server(s) 215, and deliver that media to selected ones of devices 100-1 through 100-N. CD servers 110-1 through 110-M may send playlist files to requesting ones of devices 100-1 through 100-N, and may send streaming media segment files to ones of devices 100-1 through 100-N that may request specific streaming media segment files based on previously received playlist files.

Session management server 115, as described above with respect to FIG. 1, authenticates ones of devices 100-1 through 100-N that request authentication and delivers encrypted tokens to the ones of devices 100-1 through 100-N who have successfully authenticated with server 115.

Key server 120, as described above with respect to FIG. 1, validates tokens received from ones of devices 100-1 through 100-N that request a decryption key for use in decrypting streaming media from CD server 110. Key server 120 may decrypt a token received from a device 100, validate the decrypted token, and, if the decrypted token validates successfully, may send a decryption key to the requesting device 100 for use in decrypting streaming media from CD server 110. In one implementation, key server 120 may include a network device that is separate and distinct from session management server 115 and/or content delivery server 110. In another implementation, key server 120 may include a separate logical unit or software module residing either on separate hardware or on the same hardware as session management server 115. Therefore, in this implementation, key server 120 and session management server 115 may be part of a same physical network device.

Devices 100-1 through 100-N may each execute a respective media player 220-1 through 220-N. Media players 220-1 through 220-N may "play" media and/or other data streamed, or delivered by other means, to respective devices 100-1 through 100-N from CD server 110.

Media delivery network 210 may include one or more networks including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). Network 210 may enable VCMS 202, content nodes 205-1 through 205-P, content delivery servers 110-1 through 110-M, devices 100-1 through 100-N, session management server 115, and key server 120 to communicate with one another, and/or to deliver media from one node to a next node (e.g., from content delivery server 110 to device 100).

Figure 2B:
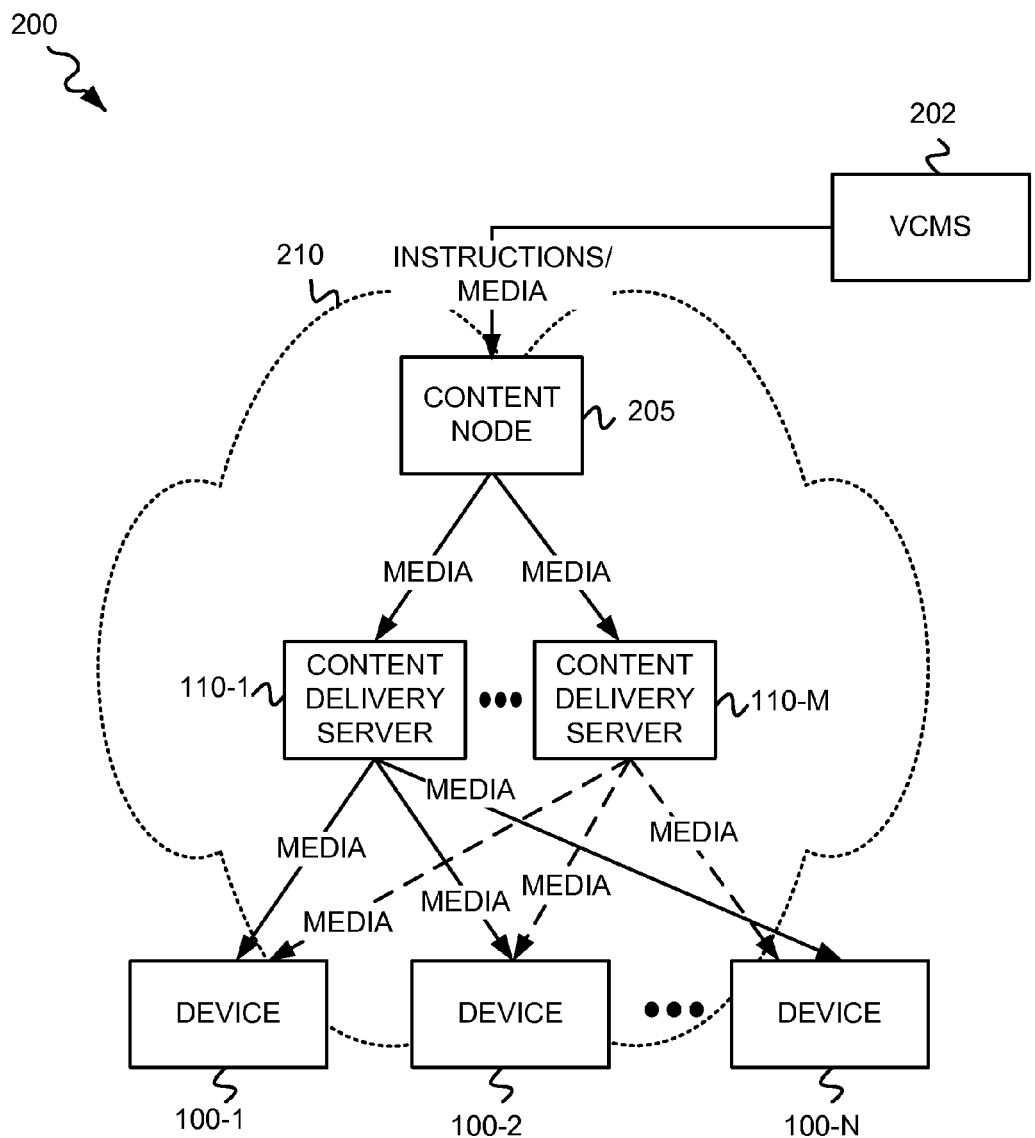
FIG. 2B depicts further details of media delivery via the various nodes of the media delivery network of FIG. 2A.

FIG. 2B depicts further details of media delivery via the various nodes of media delivery network 210. As shown in FIG. 2B, VCMS 202 may deliver media and instructions to content node 205. Content node 205 may distribute the media to multiple content delivery servers 110-1 through 110-M via network 210. In turn, content delivery servers 110-1 through 110-M may distribute the media to devices 100-1 through 100-N via network 210. For example, as depicted in FIG. 2B, content delivery server 110-1 may deliver the media to each of devices 100-1 through 100-N, and content delivery server 110-M may deliver the media to each of devices 100-1 through 100-N. The delivery of media from content node 215 to content delivery servers 110-1 through 100-M, and from content delivery servers 110-1 through 110-M to devices 110-1 through 100-N may occur via one or more intervening nodes (not shown) of network 210, which may receive and forward data units associated with the delivered media.

Figure 3:
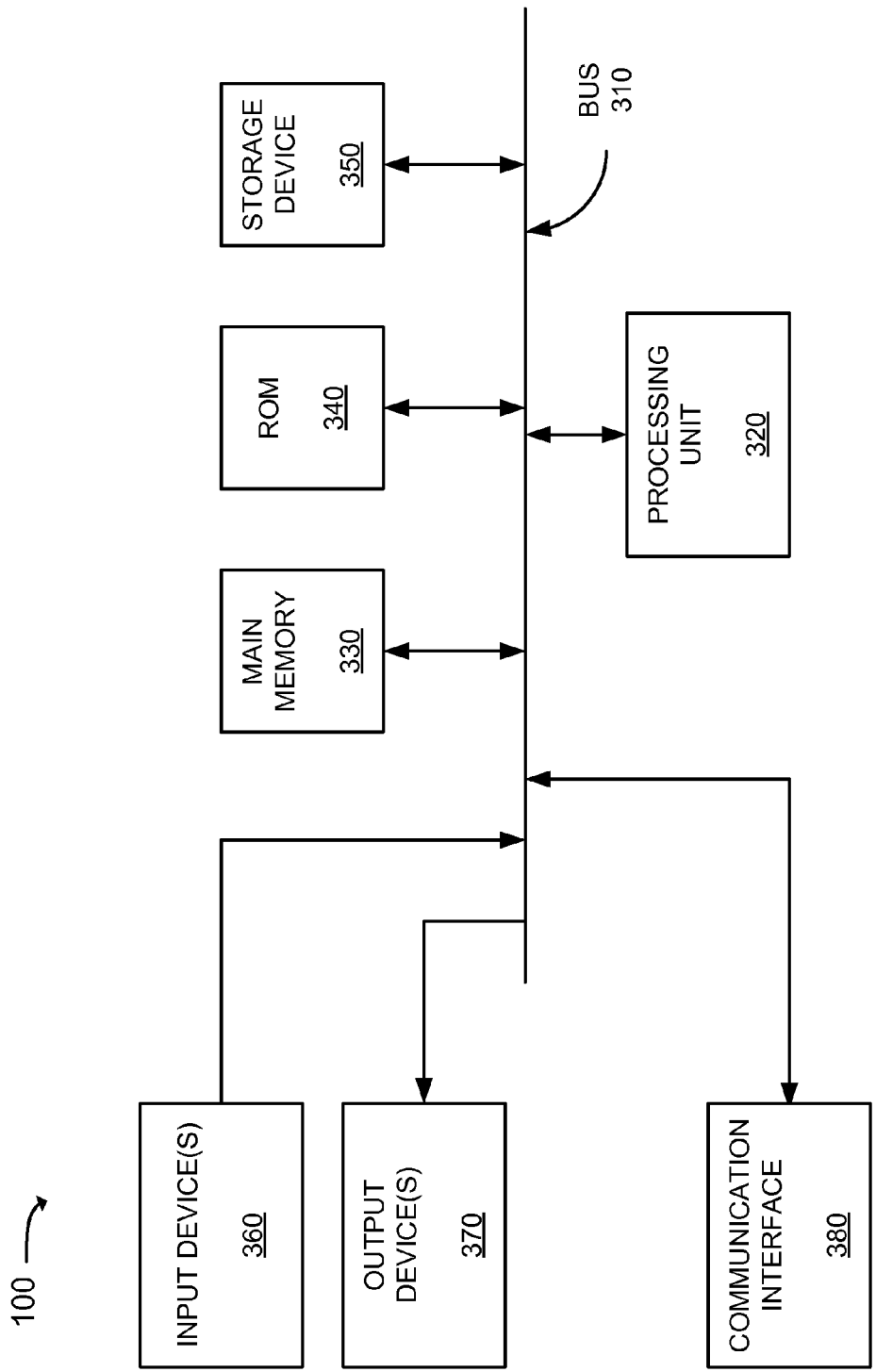
FIG. 3 is a diagram that depicts exemplary components of the device of FIG. 1.

FIG. 3 is a diagram that depicts exemplary components of device 100. Session management server 115, content delivery server 110, key server 120, content node 205, and VCMS 202 may be similarly configured. Device 100 may include a bus 310, a processing unit 320, a main memory 330, a read only memory (ROM) 340, a storage device 350, an input device(s) 360, an output device(s) 370, and a communication interface (s) 380. Bus 310 may include a path that permits communication among the components of device 100.

Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium."

Input device 360 may include one or more mechanisms that permit an operator to input information to device 100, such as, for example, a keypad or a keyboard, a display with a touch sensitive panel, voice recognition and/or biometric mechanisms, etc. Output device 370 may include one or more mechanisms that output information to the operator, including a display, a speaker, etc. Input device 360 and output device 370 may, in some implementations, be implemented as a user interface (UI) that displays UI information and which receives user input via the UI. Communication interface(s) 380 may include a transceiver that enables device 100 to communicate with other devices and/or systems. For example, communication interface(s) 380 may include wired or wireless transceivers for communicating via media delivery network 210.

The configuration of components of device 100 shown in FIG. 3 is for illustrative purposes. Other configurations may be implemented. Therefore, device 100 may include additional, fewer and/or different components than those depicted in FIG. 3.

Figure 4:
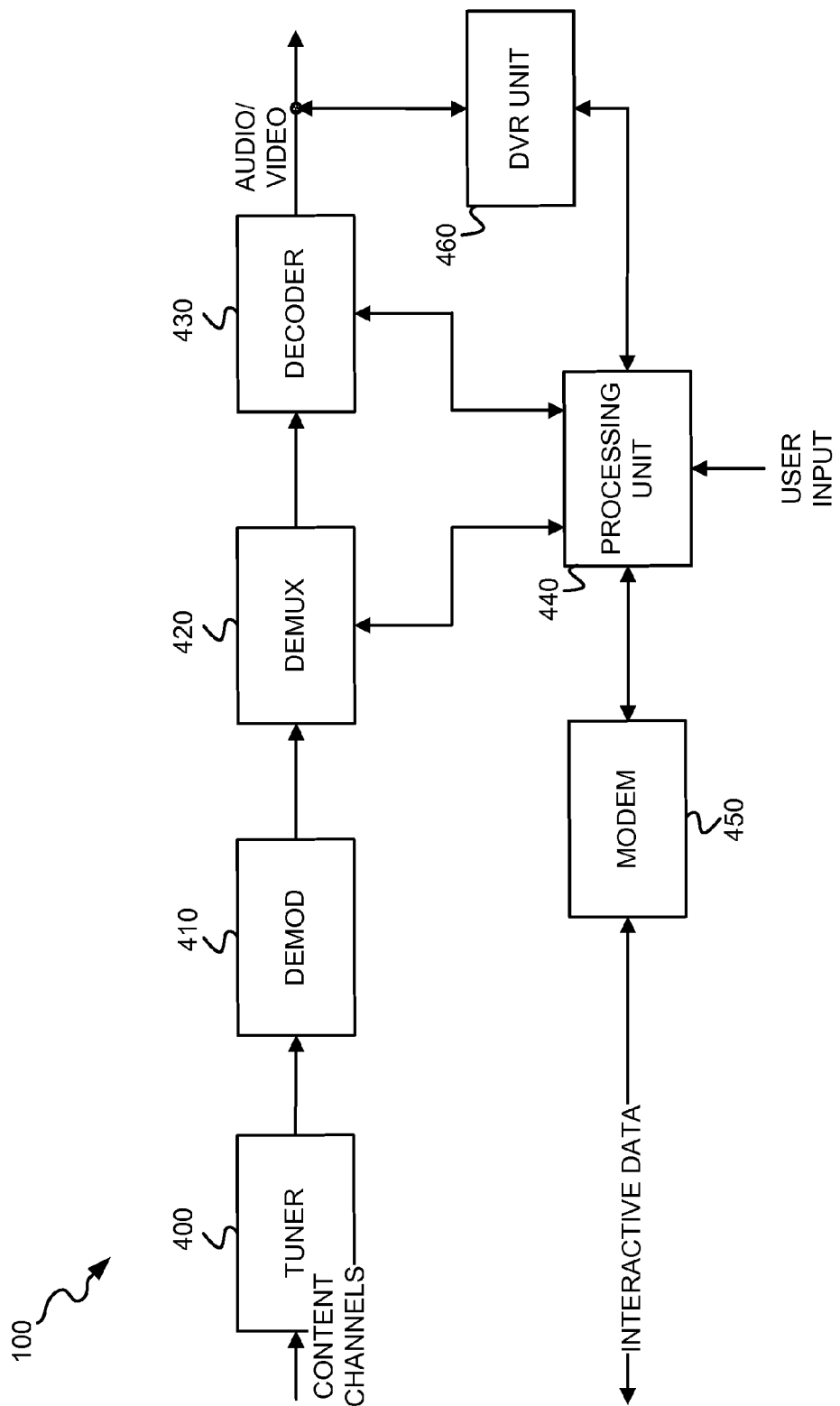
FIG. 4 is a diagram that depicts exemplary components of the device of FIG. 1, where the device is implemented as a set-top box (STB)

FIG. 4 depicts exemplary components of device 100, where device 100 is implemented as a set-top box (STB). Device 100 may include a tuner 400, a demodulator 410, a demultiplexer 420, a decoder 430, a processing unit 440, a modem 450, and a DVR unit 450. Tuner 400 may select and tune to specific broadcast television information by tuning to one of many different input channels. Each channel may be digitally modulated using, for example, quadrature amplitude modulation (QAM), though other types of modulation may be used. Demodulator 410 may demodulate the information in the channel selected by tuner 400 to produce a transport stream (e.g., MPEG-2 or MPEG-4 transport stream) containing the audio, video and/or other information related to the selected channel (e.g., a TV program).

Demultiplexer 420 may select and decrypt compressed audio and video from the transport stream for the particular TV program that the device user wishes to watch. Decoder 430 may decode and decompress the decrypted audio and video information for the selected TV program. Processing unit 440 may include, for example, a microprocessor that controls the operations performed by tuner 400, demodulator 410, demultiplexer 420, decoder 430, modem 450 and DVR unit 460 based on user input (e.g., input received from a device user via a remote control device). Modem 450 may send and receive interactive data (e.g., digital program guide information) that may be processed by processing unit 440. DVR unit 460 may digitally record, and store, audio and video content associated with the particular TV program decoded by decoder 430.

The configuration of components of STB device 100 in FIG. 4 is for illustrative purposes only. Other configurations may be implemented. Device 100 may include additional, fewer and/or different components than those depicted in FIG. 4. For example, STB 100 may include memory that is not shown in FIG. 4.

Figure 5:
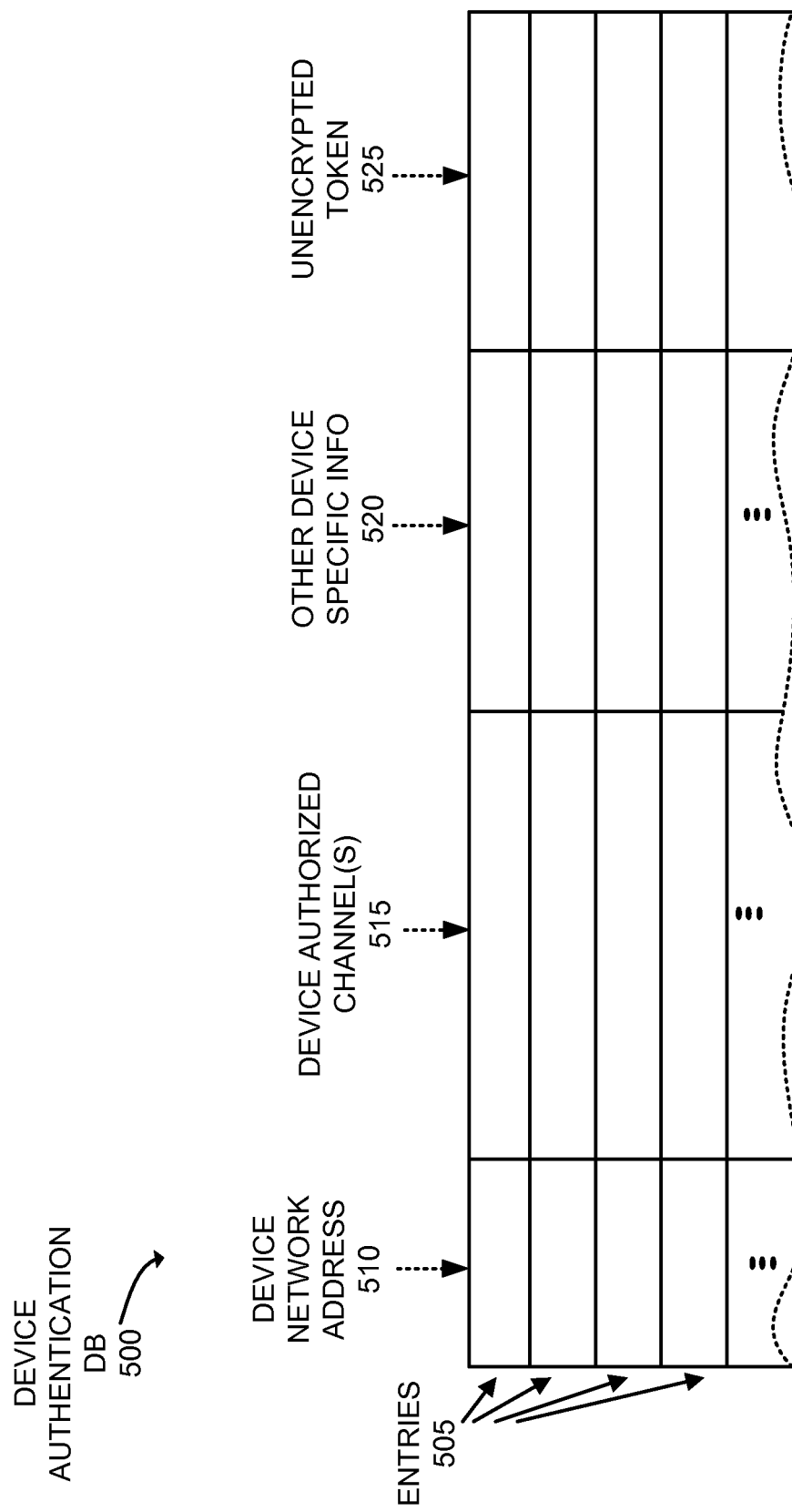
FIG. 5 is a diagram that depicts an exemplary implementation of a device authentication database.

FIG. 5 is a diagram that depicts an exemplary implementation of a device authentication database (DB) 500. As shown, device authentication DB 500 may include multiple entries 505, with each entry 505 including a device network address field 510, a field 515 including a list of authorized channels for the device, a field 520 for other device-specific information, and an unencrypted token field 525. Device network address field 510 may identify a unique network address associated with a respective device 100. The unique network address may include, for example, an IP address associated with a respective device 100. Device authorized channel(s) field 515 may include a list of channels that a respective device 100, identified in device network address field 510 of a corresponding entry 505, may be permitted to tune to receive streaming media from CD server 110. Other device specific information field 520 may include additional information about the device 100 identified by device network address field 510. For example, field 520 may store information about the type and version of media player installed at the device identified by device network address field 510. Unencrypted token field 525 may store a token, in an unencrypted format, that has been, or that may be sent to a device 100 identified in device network address field 510 of entry 505.

The number, types, and content of the entries and/or fields in device authentication DB 500 illustrated in FIG. 5 is for illustrative purposes. Other data structures having different numbers of, types of and/or content of, the entries and/or the fields may be implemented. Therefore, device authentication DB 500 may include additional, fewer and/or different entries and/or fields than those depicted in FIG. 5.

Figure 6:
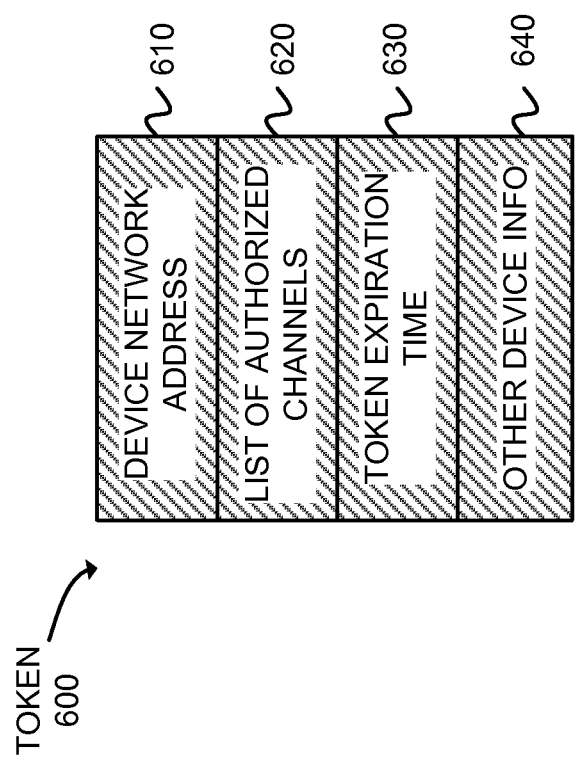
FIG. 6 is a diagram that depicts exemplary contents of a token used for token-based entitlement verification.

FIG. 6 depicts exemplary contents of a token 600 used for token-based entitlement verification, as described herein. Token 600 may be constructed by session management server 115 based on receipt of an authentication request from a device 100. Token 600 may include a device network address field 610, a list of authorized channels field 620, a token expiration time field 630, and other device information field 640.

Device network address field 610 may include the unique network address of a device 100 that has requested authentication. List of authorized channels field 620 may include a list of channels to which the device identified by device network address 610 may access (e.g., channels subscribed to). When authenticating device 100, and constructing token 600, session management server may extract the list of authorized channels 620 from device authorized channel(s) 515 of an entry 505 of device authentication DB 500 whose device network address field 510 matches the network address of the device requesting authentication. Token expiration time field 630 may include a temporal indicator that indicates a length of time that token 600 is valid. When the length of time indicated by token expiration time 630 expires, then token 600 may be considered to be invalid for purposes of token validation by key server 120. Other device information field 640 may include various other types of information about the device 100 submitting the authentication request.

The types of data field contained in token 600, as shown in FIG. 6, are for illustrative purposes. Other types of data filed may be included in token 600. Therefore, token 600 may include additional, fewer and/or different types of data fields than those depicted in FIG. 6.

Figure 7A:
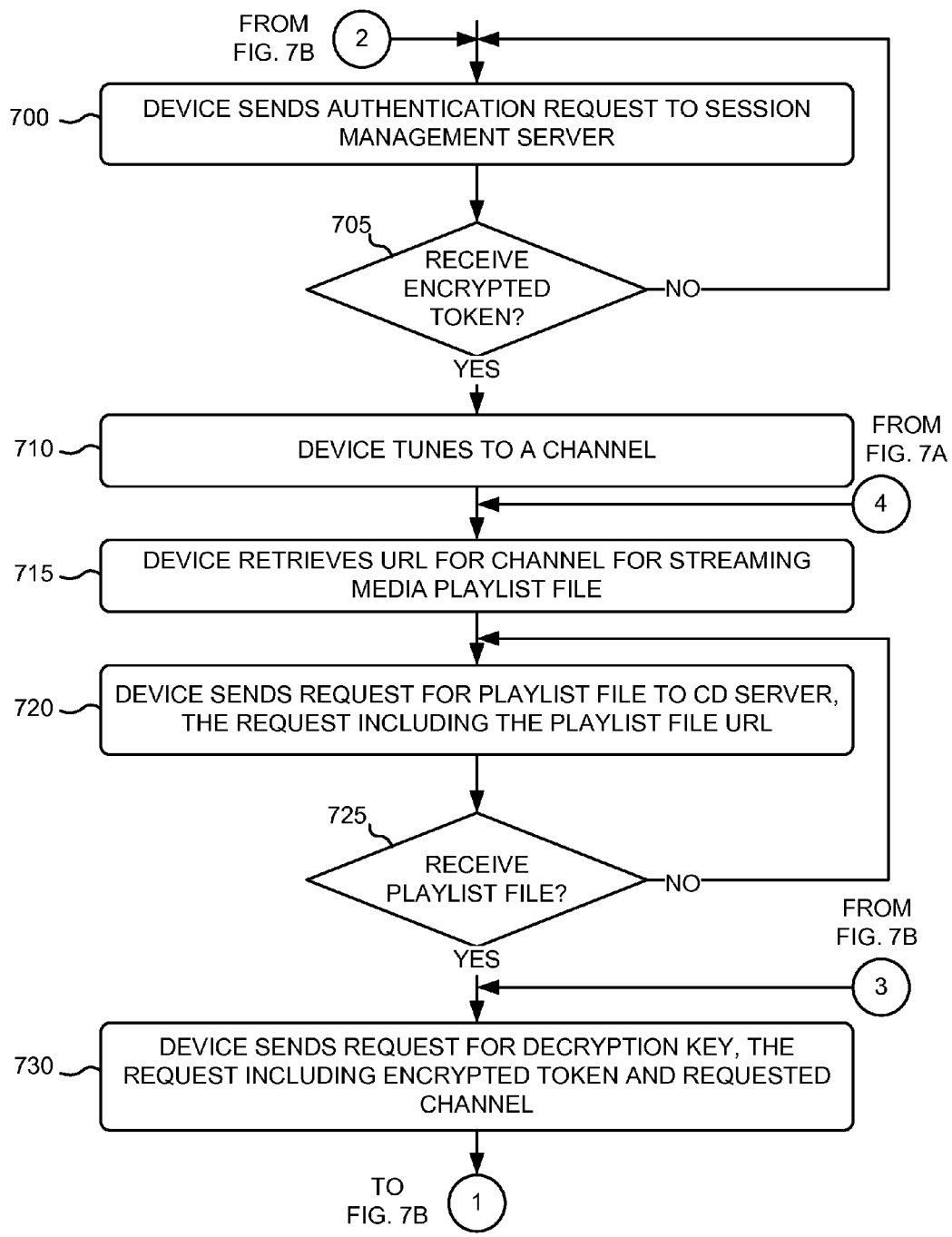
FIGS. 7A and 7B are flow diagrams that illustrate an exemplary process for token-based entitlement verification from the standpoint of the device of FIG. 1 when it is seeking to decrypt streaming media segment files received from the content delivery server of FIG. 1.
Figure 7B:
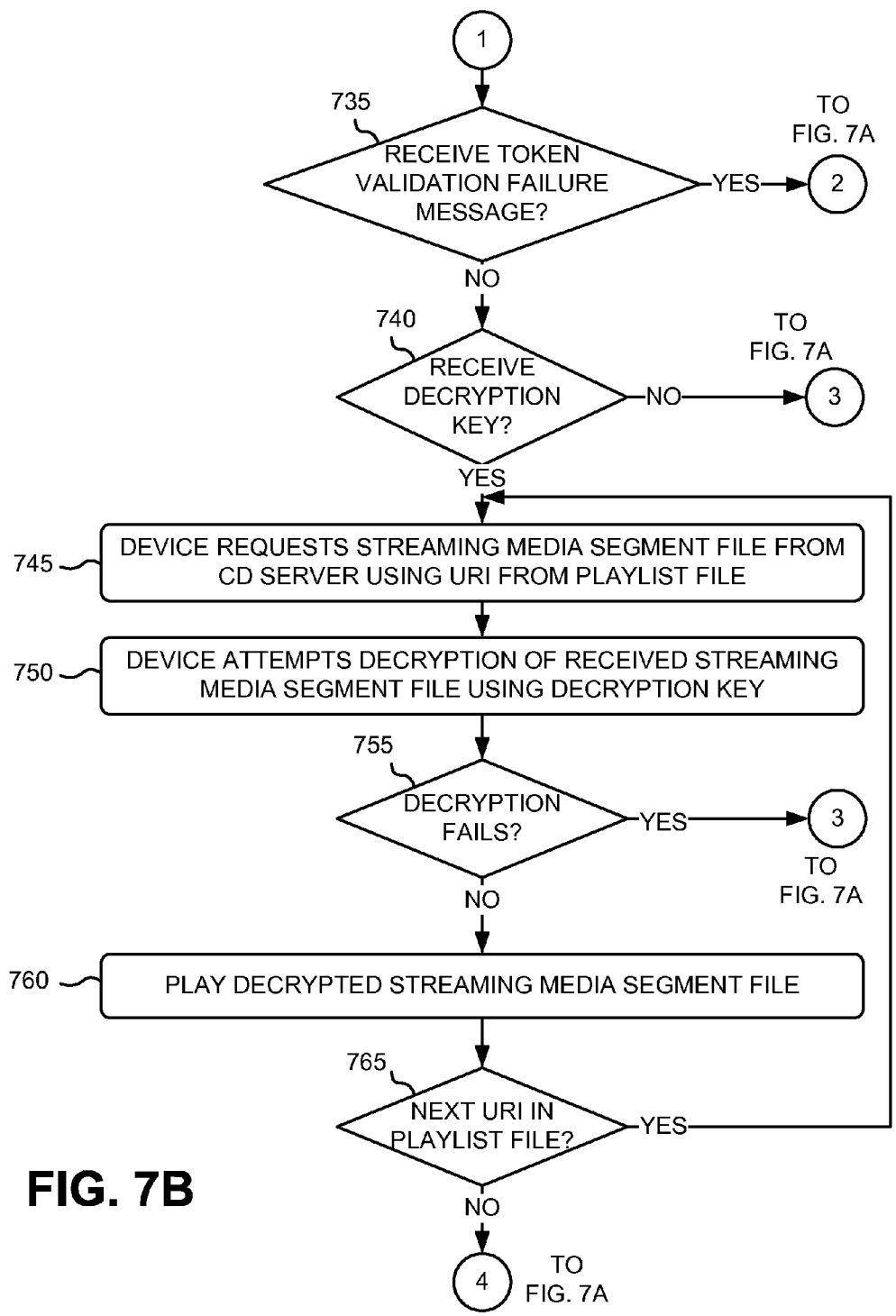

FIGS. 7A and 7B are flow diagrams that illustrate an exemplary process for token-based entitlement verification from the standpoint of a device 100 seeking to decrypt streaming media segment files received from CD server 110. The exemplary process of FIGS. 7A and 7B may be implemented by device 100. The exemplary process of FIGS. 7A and 7B is described below with reference to the messaging diagram of FIG. 8.

Figure 8:
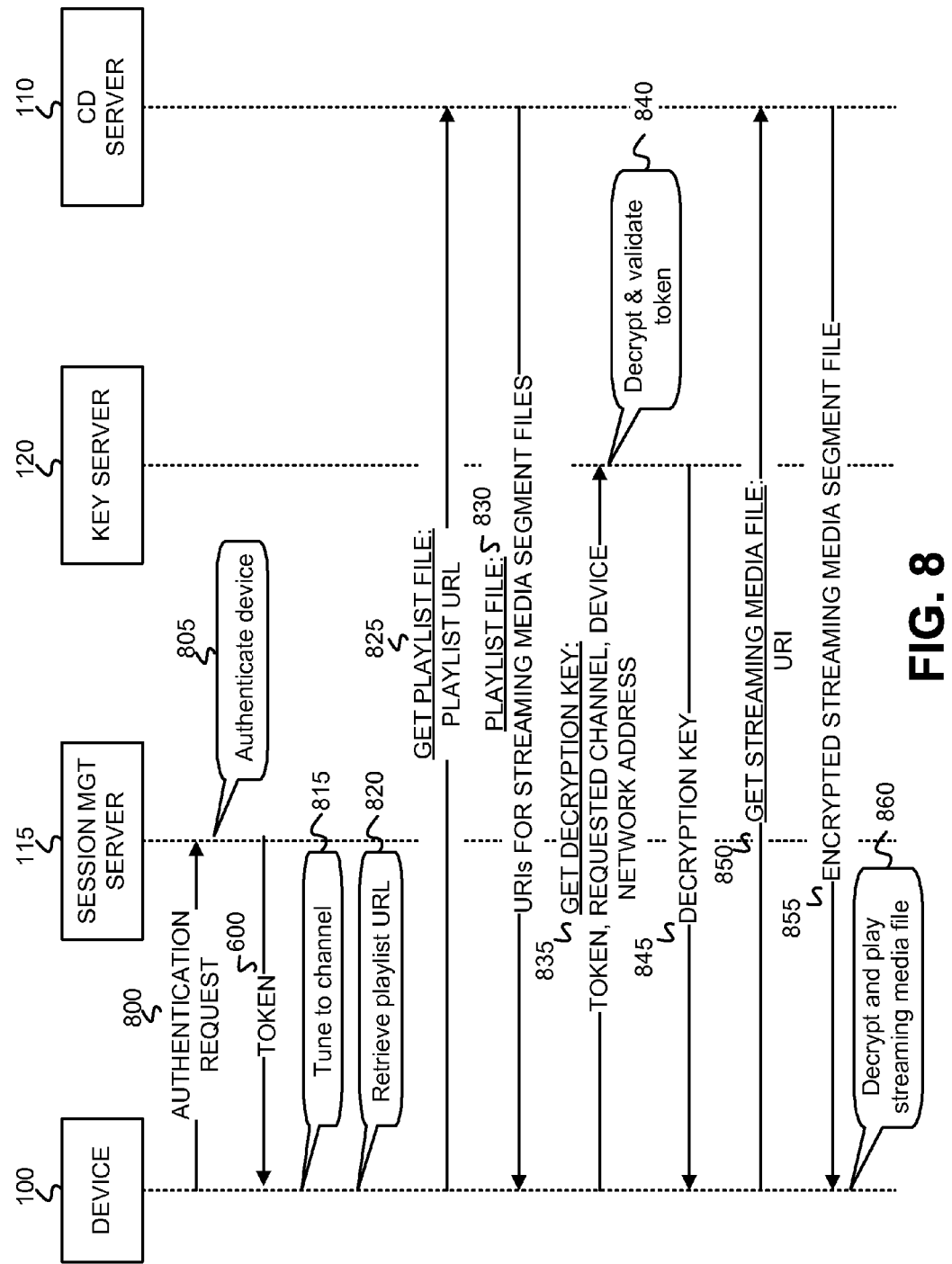
FIG. 8 is a diagram that illustrates exemplary messaging associated with the process of FIGS. 7A and 7B.

The exemplary process may include device 100 sending an authentication request to session management server 115 (block 700). The authentication request may include, for example, a unique network address of device 100, or a signature associated with device 100. The signature may include, for example, a hash of data associated with device 100, such as a hash of device 100's unique network address. FIG. 8 depicts device 100 sending an authentication request 800 to session management server 115. Upon receipt of request 800, session management server 115, as further shown in FIG. 8, authenticates 805 device 100.

Device 100 may determine whether an encrypted token has been received from session management server 115 in response to the authentication request (block 705). If device 100 authenticates successfully, session management server 115 may, as shown in FIG. 8, return token 600 to device 100. As previously described with respect to FIG. 6, token 600 may be encrypted and may include device network address field 610, list of authorized channels field 620, token expiration time field 630, and other device information field 640. If an encrypted token has been received (YES-block 705), then device 100 may tune to a channel (block 710). FIG. 8 depicts device 100 tuning 815 to a channel on network 210.

Device 100 may retrieve a Uniform Resource Locator (URL) for the tuned channel for a streaming media playlist file (block 715). Once tuned to the channel, device 100 may retrieve the URL for a streaming media playlist file from CD server 110, or from another server or network node in network 210. FIG. 8 depicts device 100 retrieving 820 the playlist file URL. Device 100 may send a request for the playlist file to CD server 110, the request including the playlist file URL (block 720). FIG. 8 shows device 100 sending a "get playlist file" message 825 to CD server 110 to obtain a playlist file that corresponds to the URL contained in message 825.

Device 100 may determine whether it has received the playlist file (block 725). Upon receipt of "get playlist file" message 825, CD server 110 retrieves the appropriate playlist file that corresponds to the URL contained in message 825, and returns a message 830 that includes the requested playlist file, where the playlist file further includes a sequential list of one or more URIs for streaming media segment files. If the playlist file has not been received (NO-block 725), then device 100 may return to block 720 to send another request for the playlist file to CD server 110. If the playlist file has been received (YES-block 725), then device 100 may send a request for a decryption key to key server 120, the request including the encrypted token received from session management server 115 in block 705, and a requested channel (block 730). FIG. 8 depicts device 100 sending a "get decryption key" message 835 to key server 120, that includes an encrypted token 600 previously obtained from session management server 115, and an identification of a requested channel that device 100 will be tuning to request streaming media from CD server 110.

Device 100 may determine whether a token validation failure message has been received from key server 120 (block 735). Upon receipt of "get decryption key" message 835, key server 120 may, as shown in FIG. 8, decrypt and validate 840 the received token, as described in further detail below with respect to the exemplary process of FIG. 10. If the decrypted token validates successfully, key server 120 may obtain a decryption key and may return the decryption key in a message 845 to device 100. If the decrypted token does not validate successfully, then key server 120 may return a token validation failure message (not shown in FIG. 8) to device 100.

If a token validation failure message is received from key server 120 (YES-block 735), then the process may return to block 700 with device 100 sending another authentication request to session management server 115.

If a token validation failure message is not received from key server 120 (NO-block 735), then device 100 may determine whether a decryption key has been received from key server 120 (block 740). If not (NO-block 740), then the process may return to block 730 with device 100 sending another request for a decryption key. If a decryption key has been received from key server 120 (YES-block 740), then device 100 may request a streaming media segment file from CD server 110 using a URI from the received playlist file (block 745). FIG. 8 depicts device 100 sending a "get streaming media file" message 850 to CD server 110 requesting a streaming media segment file that corresponds to a URI contained in the playlist file previously received from CD server 110. As shown in FIG. 8, upon receipt of "get streaming media file" message 850, CD server 110 may return a message 855 that contains the streaming media segment file corresponding to the URI from message 850, with the streaming media segment file being encrypted.

Device 100 may attempt a decryption of the streaming media segment file received from CD server 110 using the decryption key previously received in block 740 (block 750). FIG. 8 depicts device 100 successfully decrypting and playing 860 the streaming media segment file received from CD server 110 in message 855. In some instances, however, the decryption may be unsuccessful (e.g., if the decryption key has been rotated at key server 120, relative to the decryption key previously sent from key server 120 to device 100). Key server 120 may periodically rotate the decryption key (e.g., every 30 minutes) such that, by the time that device 100 attempts to decrypt a streaming media segment file using the previously received decryption key, the decryption key may no longer be the proper key for decrypting the streaming media segment file received from CD server 110. Device 100 may determine if the decryption of the streaming media segment file fails (block 755). If the decryption fails (YES-block 755), then the exemplary process may return to block 730 with device 100 requesting another decryption key from key server 120. If the decryption succeeds (NO-block 755), then device 100 may play the decrypted streaming media segment file (block 760).

Prior to completion of the playing of the decrypted streaming media segment file, device 100 may determine whether there is a next URI in the playlist file (block 765). If so, (YES-block 765), then the exemplary process may return to block 745 with device 100 requesting a next streaming media segment file from CD server 110 using a next URI from the sequence of URIs in the playlist file. If there isn't a next URI in the playlist file (NO-block 765), then the exemplary process may return to block 715 with device 100 retrieving another URL for the tuned channel for a subsequent streaming media playlist file.

Figure 9:
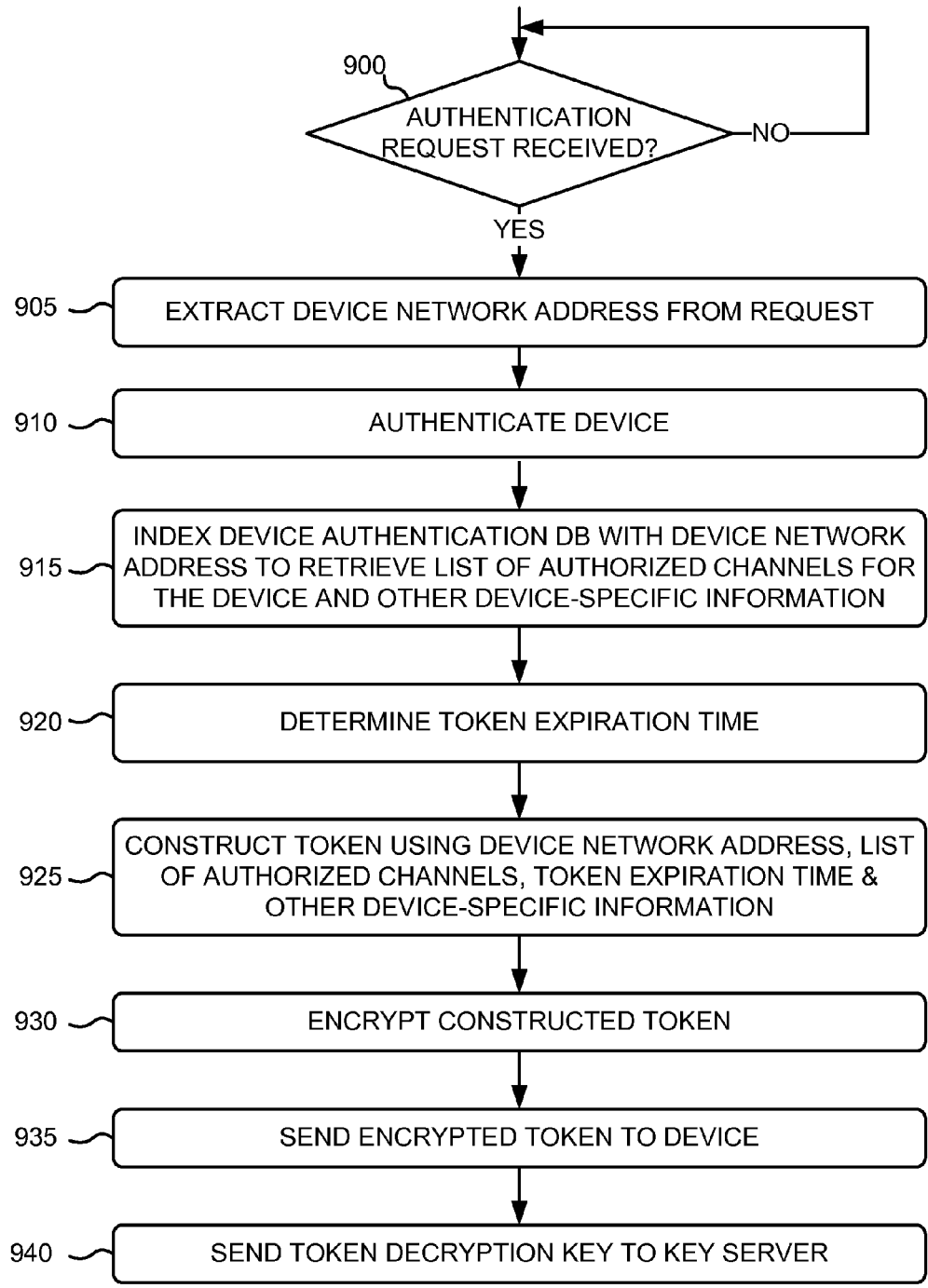
FIG. 9 is a flow diagram that illustrates an exemplary process for authenticating, by the session management server of FIG. 1, the device of FIG. 1 and delivering a token to the device based on the authentication.

FIG. 9 is a flow diagram that illustrates an exemplary process for authenticating a device 100 and delivering a token to the device 100 based on the authentication. The exemplary process of FIG. 9 may be implemented by session management server 115 as part of the token-based entitlement verification of FIGS. 7A and 7B. The exemplary process of FIG. 9 is described below with reference to the messaging diagram of FIG. 8 and the diagrams of FIGS. 5 and 6.

The exemplary process may include session management server 115 determining whether an authentication request has been received from a device 100 (block 900). As depicted in FIG. 8, session management server 115 may receive an authentication request 800 from device 100. If an authentication request has been received (YES-block 900), then server 115 may extract the device network address from the request (block 905) and may authenticate the device (block 910). Authentication of device 100 may include, for example, verifying the unique network address of device 100. In other implementations, authentication of device 100 may include verifying a signature of device 100 included in the authentication request. The signature may include, for example, a hash of the device's unique network address.

Server 115 may index device authentication DB 500 with the device network address to retrieve a list of authorized channels for the device and other device-specific information (block 915). Session management server 115 may index device authentication DB 500 with the device network address extracted from the authentication request in block 905 to find a matching device network address in a device network address field 510 of an entry 505. Session management server 115 may then retrieve the list of authorized channels from device authorized channel(s) field 515 of the entry 505, and other device specific information from other device specific information field 520.

Server 115 may determine a token expiration time (block 920). Session management server 115 may, for example, specify a standard token expiration time (e.g., 30 minutes). Server 115 may construct a token using the device network address, the list of authorized channels, the token expiration time, and the other device-specific information (block 925). For example, session management server 115 may construct token 600 of FIG. 6, inserting the device network address into device network address field 610, the list of authorized channels into list of authorized channels field 620, the token expiration time into token expiration time field 630, and the other device specific information into other device information field 640 of token 600. Server 115 may encrypt the constructed token (block 930). Server 115 may use an existing symmetric or asymmetric encryption algorithm for encrypting the constructed token, as long as key server 120 has the capability to decrypt the token (e.g., the decryption key is distributed to key server 120). Server 115 may send the encrypted token to the device 100 that requested authentication (block 935). FIG. 8 depicts session management server 115 returning token 600 to device 100. Server 115 may also send a decryption key, associated with the encryption algorithm used to encrypt the token, to key server 120 (block 940). The decryption key may, for example, include a copy of the encryption key if the encryption algorithm is a symmetric encryption algorithm.

Figure 10:
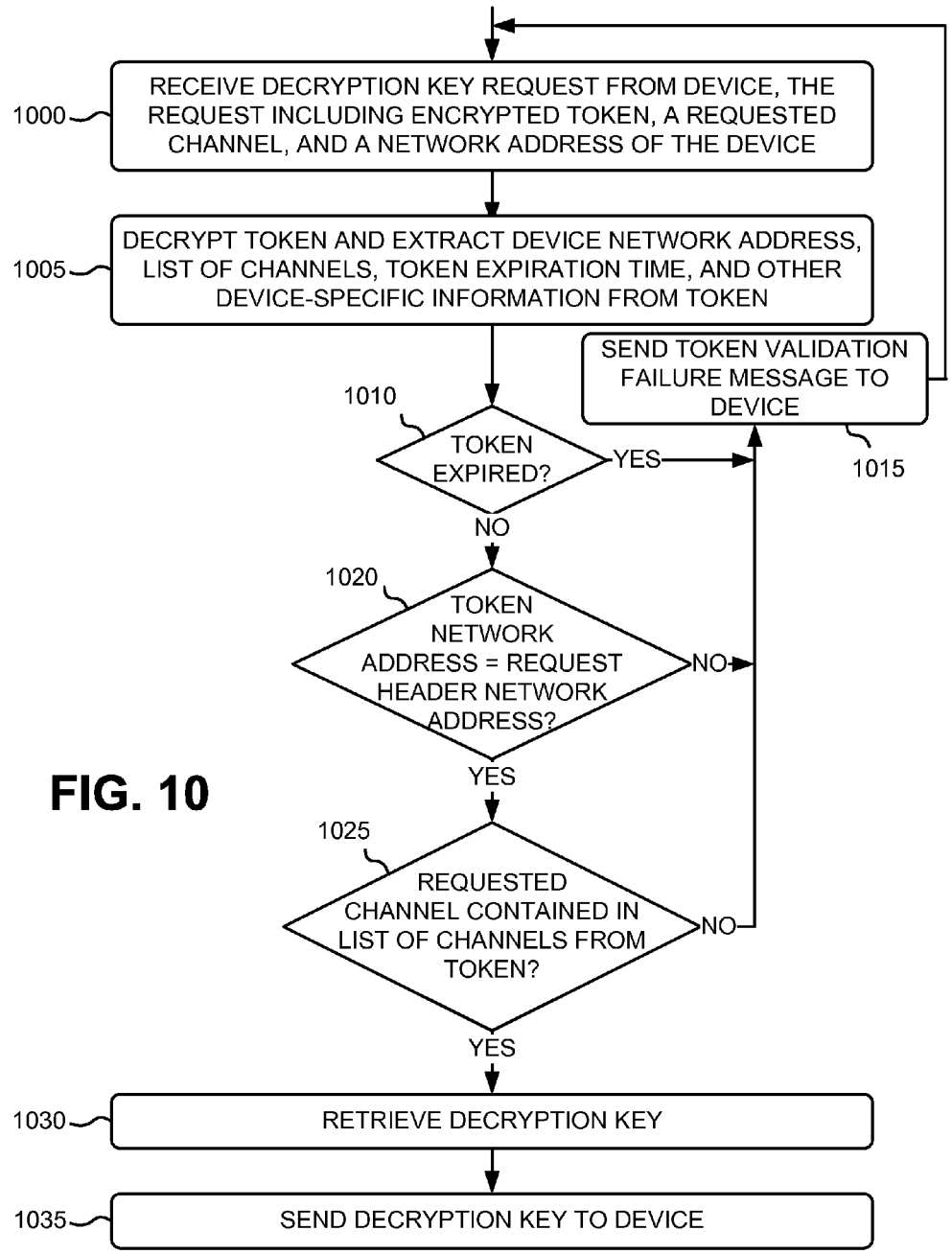
FIG. 10 is a flow diagram that illustrates an exemplary process for validating, by the key server of FIG. 1, a token received from the device of FIG. 1 and for returning a decryption key, for decrypting streaming media segment files, to the device based on the token validation.

FIG. 10 is a flow diagram that illustrates an exemplary process for validating a token received from a device 100 and for returning a decryption key, for decrypting streaming media segment files, to device 100 based on the token validation. The exemplary process of FIG. 10 may be implemented by key server 120. The exemplary process of FIG. 10 is described below with reference to the messaging diagram of FIG. 8, and the diagram of FIG. 6.

The exemplary process may include key server 120 receiving a decryption key request from device 100, the requesting including an encrypted token, a requested channel and a network address of device 100 sending the decryption key request (block 1000). FIG. 8 depicts key server 120 receiving "get decryption key" message 835 from device 100, wherein message 835 includes a token, a requested channel and a unique device network address of device 100.

Key server 120 may decrypt the token and extract a device network address, the list of channels, the token expiration time, and the other device-specific information from the decrypted token (block 1005). Subsequent to decrypting the received token 600, key server 120 may extract the device network address from device network address field 610, the list of channels from list of authorized channels field 620, the token expiration time from token expiration time field 630, and other device specific information from other device information field 640.

Validation of the token received from device 100 may include the token expiration time check of block 1010, the device network address matching of block 1020, and the channel matching of block 1025. FIG. 8 depicts key server 120 decrypting and validating 840 token 600. To begin the token validation, key server 120 may determine if the token has expired (block 1010). Key server 120 may analyze the token expiration time extracted from token expiration time field 630 of token 600 to identify whether the time has expired. If the token has expired (YES-block 1010), then key server 120 may send a token validation failure message to device 100 (block 1015) and the exemplary process may return to block 1000 with the receipt of a subsequent decryption key request.

If the token has not expired (NO-block 1010), then key server 120 may determine if the device network address extracted from the token is the same as the device network address in the header of the decryption key request (block 1020). Determining if the device network address extracted from the token received from device 100 is the same as the device network address in the header of the decryption key request serves to ensure that device 100 is the device too which the token was originally issued by session management server 135. If the token network address is not the same as the network address from the header of the decryption key request (NO-block 1020), then key server 120 may send a token validation failure message to device 100 (block 1015), and the exemplary process may return to block 1000 with the receipt of a subsequent decryption key request.

If the token network address is the same as the network address from the header of the decryption key request (YES-block 1020), then key server 120 may determine if the requested channel from the decryption key request is contained in the list of channels extracted from the decrypted token (block 1025). Device 100 may only be authorized to receive streaming media via a limited number of channels, and those channels may be contained in list of authorized channels field 620 extracted from token 600. Therefore, matching the requested channel with a channel in the list of channels extracted from the decrypted token indicates that device 100 is authorized to access the requested channel for receiving and decrypting streaming media. If the requested channel is not contained in the list of channels extracted from the decrypted token (NO-block 1025), then key server 120 may send a token validation failure message to device 100 (block 1015), and the exemplary process may return to block 1000 with the receipt of a subsequent decryption key request. If the requested channel is contained in the list of channels extracted from the decrypted token (YES-block 1025), then key server 120 may retrieve a decryption key (block 1030), and may send the decryption key to the requesting device 100 (block 1035). The decryption key for decrypting streaming media may have been previously shared between CD server 110 and key server 120.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 7A, 7B, 9 and 10, the order of the blocks may be varied in other implementations. Moreover, non-dependent blocks may be performed in parallel. Exemplary embodiments have been described herein with respect to HTTP Live Streaming (HLS). However, the principles described herein may be applied to Smooth Streaming or Adaptive Bit Rate Streaming.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   sending, via a network, an authentication request from a device to a session management server;
   receiving a token from the session management server if the device authenticates successfully, wherein the token includes a list of channels to which the device is authorized access;
   tuning, by the device, to a channel, of the listed channels, on the network;
   retrieving, via the tuned channel, a network address for a streaming media playlist file;
   obtaining, using the network address, the streaming media playlist file from a content delivery server;
   sending the token to a key server for token validation;
   receiving a decryption key from the key server if the token validates successfully;
   requesting, from the content delivery server, a first streaming media segment file identified in the playlist file;
   receiving the first streaming media segment file from the content delivery server in an encrypted form; and
   decrypting the first streaming media segment file using the decryption key.

2. The method of claim 1, wherein the token further includes a network address associated with the device and an expiration time associated with the token.

3. The method of claim 1, further comprising:
   playing the decrypted first streaming media segment file using a media player.

4. The method of claim 1, wherein the session management server, the key server, and the content delivery server are separate network devices.

5. The method of claim 1, wherein the session management server and the key server are part of a same network device.

6. The method of claim 1, further comprising:
   requesting a second streaming media segment file from the content delivery server based on the playlist file;
   receiving the second streaming media segment file from the content delivery server in an encrypted form; and
   decrypting the second streaming media segment file using the decryption key.

7. The method of claim 1, further comprising:
   receiving a token validation failure message from the key server;
   sending another authentication request from the device to the session management server;
   receiving another token from the session management server if the device authenticates successfully.

8. The method of claim 1, wherein the device comprises a digital computing device that has a capability to communicate via the network to receive streaming media.

9. The method of claim 8, wherein the digital computing device comprises a cellular telephone, a computer, a set-top box (STB), or a personal digital assistant (PDA).

10. The method of claim 1, wherein the streaming media playlist file comprises a Hypertext Transfer Protocol (HTTP) Live Streaming (HLS) playlist file.

11. A device, comprising:
   a communication interface including a transceiver configured to connect to a network and to:
      send an authentication request to a first server;
      receive a token from the first server based on a successful authentication of the device by the first server, wherein the token includes a list of channels to which the device is authorized access;
      obtain, via one of the listed channels, a streaming media playlist file from a second server;
      send, responsive to obtaining the playlist file, the token to a third server for token validation;
      receive a decryption key from the third server based on a successful validation of the token;
      request, from the second server device, a first streaming media segment file identified in the playlist file;
      receive the first streaming media segment file from the second server; and
   a processing unit configured to decrypt the first streaming media segment file using the decryption key,
   wherein the first server and the third server are separate and distinct network devices.

12. The device of claim 11, wherein the first server, the second server and the third server are separate and distinct network devices.

13. The device of claim 11, wherein the token further includes a network address associated with the device, and an expiration time associated with the token.

14. The device of claim 11, wherein the device comprises a cellular telephone, a computer, a set-top box (STB), or a personal digital assistant (PDA).

15. The device of claim 11, wherein the processing unit is further configured to:
   play the decrypted first streaming media segment file using a media player.

16. The device of claim 11, wherein the transceiver is further configured to:
   send a request for a second streaming media segment file from the second server based on the playlist file;

receive the second streaming media segment file from the second server, and wherein the processing unit is further configured to decrypt the second streaming media segment file using the decryption key.

17. The device of claim 11, wherein the transceiver is further configured to:
receive a token validation failure message from the second server,
send another authentication request to the first server; and
receive another token from the first server based on successful authentication of the device by the first server.

18. The device of claim 11, wherein the streaming media playlist file comprises a Hypertext Transfer Protocol (HTTP) Live Streaming (HLS) playlist file.

19. A tangible non-transitory computer-readable medium containing instructions executable by at least one processing unit, the computer-readable medium comprising:
one or more instructions for receiving a decryption key request from a device, the request including an encrypted token, a requested channel and a device network address associated with the device;
one or more instructions for decrypting the token;
one or more instructions for extracting:
a second network address from a first field in the token,
a list of authorized channels from a second field in the token, and
a token expiration time from a third field in the token;
one or more instructions for validating the token based on:
a first comparison of the extracted second network address to the device network address,
a second comparison of the extracted list of authorized channels to the requested channel, and
a check of the extracted token expiration time; and
one or more instructions for sending a decryption key to the device based on results of validating the token.

20. The tangible non-transitory computer-readable medium of claim 19, wherein the one or more instructions for validating the token comprises:

one or more instructions for determining whether the token expiration time indicates that the token has expired.

21. The tangible non-transitory computer-readable medium of claim 20, wherein the one or more instructions for validating the token further comprises:
one or more instructions for sending a message indicating that token validation has failed if the token expiration time indicates that the token has expired.

22. The tangible non-transitory computer-readable medium of claim 19, wherein the one or more instructions for validating the token comprises:
one or more instructions for determining whether the device network address associated with the device matches the second network address extracted from the token.

23. The tangible non-transitory computer-readable medium of claim 22, wherein the one or more instructions for validating the token comprises:
one or more instructions for sending a message indicating that token validation has failed if the device network address does not match the second network address extracted from the token.

24. The tangible non-transitory computer-readable medium of claim 19, wherein the one or more instructions for validating the token comprises:
one or more instructions for determining whether the requested channel is contained in the list of authorized channels extracted from the token.

25. The tangible non-transitory computer-readable medium of claim 24, wherein the one or more instructions for validating the token comprises:
one or more instructions for sending a message indicating that token validation has failed if the requested channel is not contained in the list of channels extracted from the token.

* * * * *